(12) United States Patent
Banerjee et al.

(10) Patent No.: US 8,597,788 B2
(45) Date of Patent: *Dec. 3, 2013

(54) CONDUCTIVE WIRE COMPRISING A POLYSILOXANE/POLYIMIDE COPOLYMER BLEND

(75) Inventors: Susanta Banerjee, Kharagpur (IN); Robert Russell Gallucci, Mt. Vernon, IN (US); Gurulingamurthy M. Haralur, Bangalore (IN); Ganesh Kailasam, Pearland, TX (US); William A. Kernick, III, Niskayuna, NY (US); Utpal Mahendra Vakil, Bangalore (IN)

(73) Assignee: Sabic Innovative Plastics IP B.V. (NL)

( * ) Notice: Subject to any disclaimer, the term of this patent is extended or adjusted under 35 U.S.C. 154(b) by 0 days.

This patent is subject to a terminal disclaimer.

(21) Appl. No.: 13/082,859

(22) Filed: Apr. 8, 2011

(65) Prior Publication Data
US 2011/0180299 A1  Jul. 28, 2011

Related U.S. Application Data

(62) Division of application No. 11/425,739, filed on Jun. 22, 2006, now Pat. No. 8,491,997.

(51) Int. Cl.
*B32B 15/00* (2006.01)

(52) U.S. Cl.
USPC ........ 428/379; 428/375; 428/391; 174/110 R; 174/110 SR; 174/110 S; 525/431

(58) Field of Classification Search
None
See application file for complete search history.

(56) References Cited

U.S. PATENT DOCUMENTS

| | | |
|---|---|---|
| 3,185,719 A | 5/1965 | Prober |
| 3,325,450 A | 6/1967 | Holub |
| 3,833,546 A | 9/1974 | Takekoshi et al. |
| 3,847,867 A | 11/1974 | Heath et al. |
| 3,850,885 A | 11/1974 | Takekoshi et al. |
| 3,852,242 A | 12/1974 | White |
| 3,855,178 A | 12/1974 | White et al. |
| 3,972,902 A | 8/1976 | Heath et al. |
| 3,983,093 A | 9/1976 | Williams, III et al. |
| 3,986,477 A | 10/1976 | Bigland |
| 4,011,279 A | 3/1977 | Berger et al. |
| 4,038,237 A | 7/1977 | Snyder |
| 4,051,163 A | 9/1977 | Berger |
| 4,395,527 A | 7/1983 | Berger |
| 4,404,350 A * | 9/1983 | Ryang ............................ 528/26 |
| 4,414,355 A | 11/1983 | Pokorny |
| 4,443,591 A | 4/1984 | Schmidt et al. |

(Continued)

FOREIGN PATENT DOCUMENTS

| | | |
|---|---|---|
| EP | 8700846 | 2/1987 |
| EP | 266595 A2 | 5/1988 |

(Continued)

OTHER PUBLICATIONS

DE19737309 Rous et al., electronic translation, Mar. 1999.

(Continued)

*Primary Examiner* — Jill Gray
(74) *Attorney, Agent, or Firm* — Cantor Colburn LLP; Diderico van Eyl

(57) ABSTRACT

Disclosed herein are polysiloxane/polyimide block copolymer blends and the application of these blends in conductive wires.

10 Claims, 3 Drawing Sheets

(56) References Cited

U.S. PATENT DOCUMENTS

| | | | |
|---|---|---|---|
| 4,455,410 A | 6/1984 | Giles, Jr. | |
| 4,517,342 A | 5/1985 | Ryang | |
| 4,522,985 A | 6/1985 | Ryang | |
| 4,558,110 A | 12/1985 | Lee | |
| 4,586,997 A | 5/1986 | Lee | |
| 4,588,546 A | 5/1986 | Feil et al. | |
| 4,690,997 A | 9/1987 | Cella et al. | |
| 4,808,686 A | 2/1989 | Cella et al. | |
| 4,810,728 A | 3/1989 | Gross et al. | |
| 4,826,916 A | 5/1989 | Policastro et al. | |
| 4,829,131 A | 5/1989 | Lee | |
| 4,848,869 A | 7/1989 | Urruti | |
| 4,941,729 A | 7/1990 | Hardin et al. | |
| 4,960,837 A | 10/1990 | Alesbury | |
| 4,968,757 A * | 11/1990 | Lee | 525/426 |
| 4,981,894 A | 1/1991 | Nye et al. | |
| 5,028,681 A | 7/1991 | Peters | |
| 5,074,640 A | 12/1991 | Hardin et al. | |
| 5,104,958 A | 4/1992 | Bolon et al. | |
| 5,106,915 A | 4/1992 | Rock et al. | |
| 5,202,946 A | 4/1993 | Hardin et al. | |
| 5,209,981 A * | 5/1993 | Rojstaczer | 428/447 |
| 5,280,085 A | 1/1994 | Rock et al. | |
| 5,317,049 A * | 5/1994 | Rojstaczer et al. | 524/104 |
| 5,385,970 A | 1/1995 | Gallucci et al. | |
| 5,437,930 A | 8/1995 | Redondo et al. | |
| 5,552,222 A | 9/1996 | Bolon et al. | |
| 5,625,011 A | 4/1997 | Palsule | |
| 5,660,932 A | 8/1997 | Durston | |
| 5,932,345 A | 8/1999 | Furutani et al. | |
| 5,935,372 A * | 8/1999 | Rojstaczer et al. | 156/329 |
| 6,054,028 A | 4/2000 | Zingheim et al. | |
| 6,110,592 A | 8/2000 | Grizante et al. | |
| 6,140,411 A | 10/2000 | Schwamborn et al. | |
| 6,156,820 A | 12/2000 | Choi | |
| 6,214,462 B1 | 4/2001 | Andre et al. | |
| 6,297,341 B1 | 10/2001 | Ueki et al. | |
| 6,693,162 B2 | 2/2004 | Tsuji et al. | |
| 6,876,807 B2 | 4/2005 | Lanier et al. | |
| 6,985,690 B2 | 1/2006 | Odell et al. | |
| 7,652,107 B2 * | 1/2010 | Gallucci et al. | 525/446 |
| 2003/0057601 A1 | 3/2003 | Reitz et al. | |
| 2004/0232598 A1 * | 11/2004 | Donea et al. | 264/322 |
| 2005/0143534 A1 | 6/2005 | Dueber et al. | |
| 2006/0054513 A1 | 3/2006 | Lequeux et al. | |
| 2007/0298255 A1 * | 12/2007 | Banerjee et al. | 428/375 |
| 2007/0299213 A1 * | 12/2007 | Banerjee et al. | 525/431 |
| 2007/0299215 A1 | 12/2007 | Banerjee et al. | |
| 2008/0223602 A1 | 9/2008 | Gallucci et al. | |
| 2008/0236864 A1 | 10/2008 | Haralur | |
| 2009/0234060 A1 | 9/2009 | Haralur et al. | |
| 2010/0147548 A1 | 6/2010 | Bhandari et al. | |
| 2011/0180299 A1 * | 7/2011 | Banerjee et al. | 174/110 N |

FOREIGN PATENT DOCUMENTS

| | | | |
|---|---|---|---|
| EP | 0266595 A2 | 5/1988 | |
| EP | 0273150 A2 | 7/1988 | |
| EP | 0295561 A2 | 12/1988 | |
| EP | 0407061 A1 | 1/1991 | |
| EP | 0448359 A1 | 9/1991 | |
| EP | 0323142 B1 | 9/1993 | |
| EP | 0568923 A1 | 11/1993 | |
| EP | 9502642 | 1/1995 | |
| EP | 0719818 A1 | 7/1996 | |
| EP | 0822559 A1 | 2/1998 | |
| EP | 1550698 A2 | 7/2005 | |
| WO | 8700846 A1 | 2/1987 | |
| WO | WO 87/00846 | * | 2/1987 |
| WO | 9502642 A1 | 1/1995 | |
| WO | 0026277 | 5/2000 | |

OTHER PUBLICATIONS

DE19738082, Published Mar. 4, 1999, Abstract Only, 1 page.

Hedrick, J.C., et al., "Poly(arylene ether ketone)/Poly(aryl imide) Homo- and Polydimethylsiloxane Segmented Copolymer Blends: Influence of Chemical Structure on Miscibility and Physical Property Behavior", 35th International SAMPE Symposium, Apr. 2-5, 1990, 15 pages.

McGrath, J. E., et al. "Synthesis and Characterization of Segmented Polyimide-Polyorganosiloxane Copolymers" Advances in Polymer Science, vol. 140, 1999, 61-105.

http://www.ides.com/grades/ds/E110902.htm.

http://www.ides.com/grades/ds/E110903.htm.

International Search Report for International Application No. PCT/US2007/068124, mailed Sep. 13, 2007, 6 pages.

Written Opinion for International Application No. PCT/US2007/068124, mailed Sep. 13, 2007, 6 pages.

Seguchi et al. "Electrical and Mechanical Properties of Coaxial Cable for Use Under High Temperature and Radioactive Conditions", Electrical Engineering in Japan, vol. 118, No. 2, 1997. Translated from Denki Gakkai Ronbunshi, vol. 116-A, No. 2, Feb. 1996, pp. 157-162.

ULTEM Profile, GE Plastics, 2001, 41 pages.

* cited by examiner

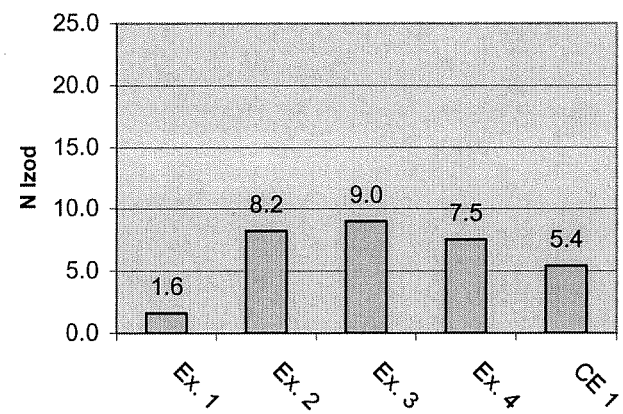
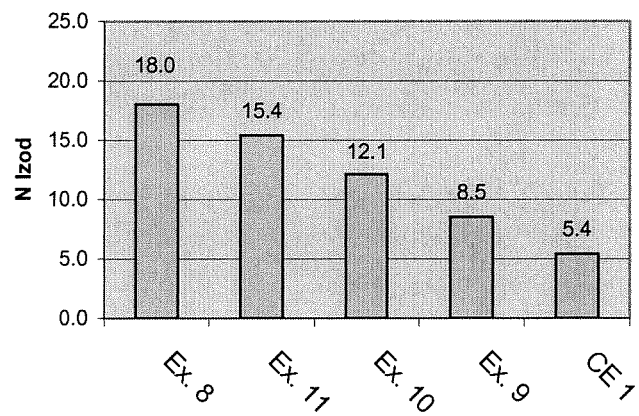

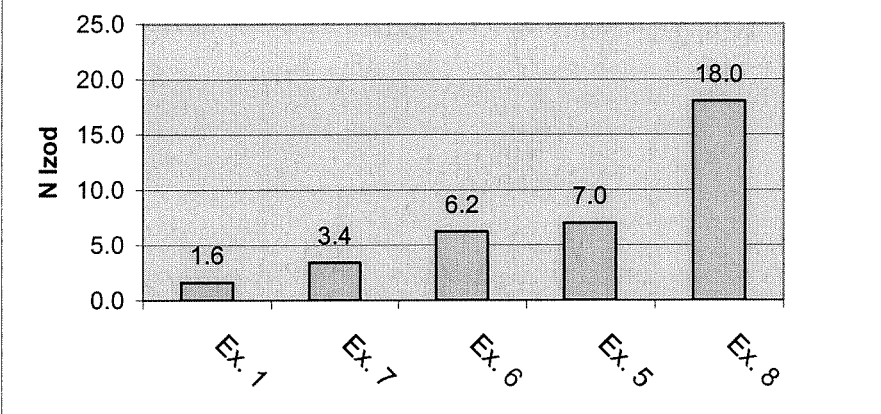

CONDUCTIVE WIRE COMPRISING A POLYSILOXANE/POLYIMIDE COPOLYMER BLEND

BACKGROUND OF INVENTION

The disclosure relates to polysiloxane/polyimide block copolymers. In particular, the disclosure relates to polysiloxane/polyimide block copolymers used in conductive wire.

Polysiloxane/polyimide block copolymers have been used due to their flame resistance and high temperature stability. In some applications a greater impact strength, particularly in combination with a low flexural modulus and a high tensile elongation is desirable. Accordingly, a need remains for polysiloxane/polyimide block copolymer compositions having a desired combination of low flammability, high temperature stability, low flexural modulus, high tensile elongation and high impact strength.

BRIEF DESCRIPTION OF THE INVENTION

The aforementioned needs are addressed by a polysiloxane/polyimide block copolymer having a siloxane content of 5 to 30 weight percent, based on the total weight of the block copolymer and comprising repeating units of Formula (I)

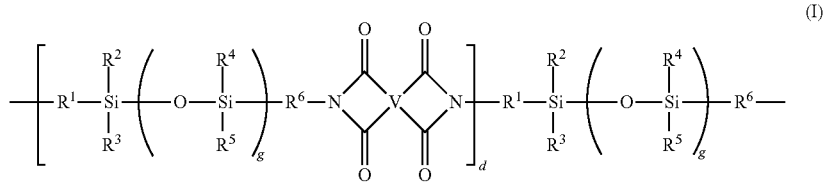

(I)

wherein $R^{1-6}$ are independently at each occurrence selected from the group consisting of substituted or unsubstituted, saturated, unsaturated or aromatic monocyclic and polycyclic groups having 5 to 30 carbon atoms, substituted or unsubstituted alkyl groups having 1 to 30 carbon atoms and substituted or unsubstituted alkenyl groups having 2 to 30 carbon atoms, V is a tetravalent linker selected from the group consisting of substituted or unsubstituted, saturated, unsaturated or aromatic monocyclic and polycyclic groups having 5 to 50 carbon atoms, substituted or unsubstituted alkyl groups having 1 to 30 carbon atoms, substituted or unsubstituted alkenyl groups having 2 to 30 carbon atoms and combinations comprising at least one of the foregoing linkers, g equals 1 to 30, and d is greater than or equal to 1.

In one embodiment, a thermoplastic composition comprises:
  a first polysiloxane/polyimide block copolymer having a first siloxane content, based on the total weight of the first block copolymer, and comprising repeating units of Formula (I); and
  a second polysiloxane/polyimide block copolymer having a second siloxane content, based on the total weight of the second block copolymer, and comprising repeating units of Formula (I);
  wherein the first siloxane content does not equal the second siloxane content.

In one embodiment a thermoplastic composition comprises:
  a first polysiloxane/polyimide block copolymer having a first siloxane content, based on the total weight of the first block copolymer, and comprising repeating units of Formula (I); and
  a second polysiloxane/polyimide block copolymer having a second siloxane content, based on the total weight of the second block copolymer, and comprising repeating units of Formula (I)
  wherein the first siloxane content equals the second siloxane content and the value of d for the first polysiloxane/polyimide block copolymer does not equal the value of d for the second polysiloxane/polyimide block copolymer.

Also described herein are the method of making the polysiloxane/polyimide block copolymer, the methods of making the blends of block copolymers, and articles comprising the block copolymers.

BRIEF DESCRIPTION OF THE DRAWINGS

FIGS. 4-6 are graphs of data from the Examples.

DETAILED DESCRIPTION

Figure 1:
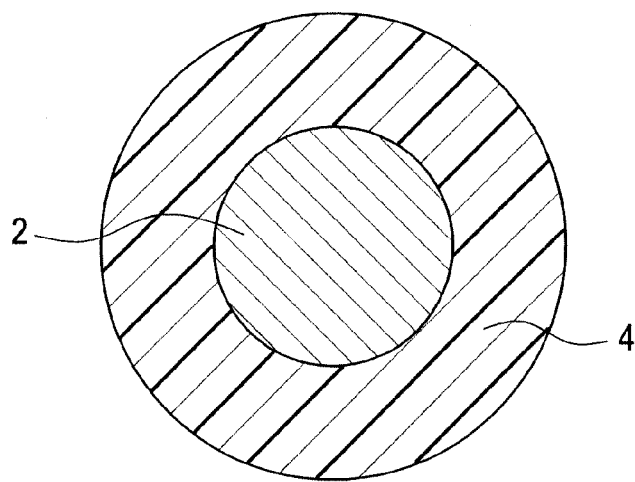
FIG. 1 is a schematic representation of a cross-section of conductive wire.

The terms "first," "second," and the like, "primary," "secondary," and the like, as used herein do not denote any order, quantity, or importance, but rather are used to distinguish one element from another.

The terms "a" and "an" do not denote a limitation of quantity, but rather denote the presence of at least one of the referenced item.

"Optional" or "optionally" means that the subsequently described event or circumstance may or may not occur, and that the description includes instances where the event occurs and instances where it does not.

The term "alkyl" is intended to include both $C_{1-30}$ branched and straight-chain, unsaturated aliphatic hydrocarbon groups having the specified number of carbon atoms. Examples of alkyl include but are not limited to, methyl, ethyl, n-propyl, i-propyl, n-butyl, s-butyl, t-butyl, n-pentyl, s-pentyl, n- and s-hexyl, n- and s-heptyl, and, n- and s-octyl.

The term "alkenyl" is defined as a $C_{2-30}$ branched or straight-chain unsaturated aliphatic hydrocarbon groups having one or more double bonds between two or more carbon atoms. Examples of alkenyl groups include ethenyl, propenyl, butenyl, pentenyl, hexenyl, heptenyl, octenyl and nonenyl and the corresponding $C_{2-10}$ dienes, trienes and quadenes.

The term "alkynyl" is defined as a $C_{2-10}$ branched or straight-chain unsaturated aliphatic hydrocarbon groups having one or more triple bonds between two or more carbon atoms. Examples of alkynes include ethynyl, propynyl, butynyl, pentynyl, hexynyl, heptynyl, octynyl and nonynyl.

The term "substituted" means that one or more hydrogens on the molecule, portion of the molecule, or atom are replaced with substitution groups provided that an atom's normal valency is not exceeded, and that the substitution results in a stable compound. Such "substitution groups" may be selected from the group consisting of: —OR, —NR'R, —C(O)R, —SR, -halo, —CN, —NO$_2$, —SO$_2$, phosphoryl, imino, thioester, carbocyclic, aryl, heteroaryl, alkyl, alkenyl, bicyclic and tricyclic groups. When a substitution group is a keto (i.e., =O) group, then 2 hydrogens on the atom are replaced. Keto substituents are not present on aromatic moieties. The terms R and R' refer to alkyl groups that may be the same or different.

The description is intended to include all permutations and combinations of the substitution groups on the backbone units specified by Formulas I above with the proviso that each permutation or combination can be selected by specifying the appropriate R or substitution groups.

Thus, for example, the term "substituted $C_{1-10}$ alkyl" refers to alkyl moieties containing saturated bonds and having one or more hydrogens replaced by, for example, halogen, carbonyl, alkoxy, ester, ether, cyano, phosphoryl, imino, thioester, sulfonyl, nitro, heterocyclo, aryl, or heteroaryl.

The terms "halo" or "halogen" as used herein refer to fluoro, chloro, bromo and iodo.

The term "monocyclic" as used herein refers to groups comprising a single ring system. The ring system may be aromatic, heterocyclic, aromatic heterocyclic, a saturated cycloalkyl, or an unsaturated cycloalkyl. The monocyclic group may be substituted or unsubstituted. Monocyclic alkyl groups may have 5 to 12 ring members.

The term "polycyclic" as used herein refers to groups comprising multiple ring systems. The rings may be fused or unfused. The polycyclic group may be aromatic, heterocyclic, aromatic heterocyclic, a saturated cycloalkyl, an unsaturated cycloalkyl, or a combination of two or more of the foregoing. The polycyclic group may be substituted or unsubstituted. Polycyclic groups may have 6 to 20 ring members.

The term "aryl" is intended to mean an aromatic moiety containing the specified number of carbon atoms, such as, but not limited to phenyl, tropone, indanyl or naphthyl.

The terms "cycloalkyl" are intended to mean any stable ring system, which may be saturated or partially unsaturated. Examples of such include, but are not limited to, cyclopropyl, cyclopentyl, cyclohexyl, norbornyl, bicyclo[2.2.2]nonane, adamantyl, or tetrahydronaphthyl(tetralin).

As used herein, the term "heterocycle" or "heterocyclic system" is intended to mean a stable 5- to 7-membered monocyclic or 7- to 10-membered bicyclic heterocyclic ring which is saturated, partially unsaturated, unsaturated or aromatic, and which consists of carbon atoms and 1 to 4 heteroatoms independently selected from the group consisting of N, O and S and including any bicyclic group in which any of the above-defined heterocyclic rings is fused to a benzene ring. The nitrogen and sulfur heteroatoms may optionally be oxidized. The heterocyclic ring may be attached to its pendant group at any heteroatom or carbon atom that results in a stable structure. In this regard, a nitrogen in the heterocycle may optionally be quaternized. When the total number of S and O atoms in the heterocycle exceeds 1, then these heteroatoms are not adjacent to one another. In some embodiments the total number of S and O atoms in the heterocycle is not more than 1.

As used herein, the term "aromatic heterocyclic system" is intended to mean a stable 5- to 7-membered monocyclic or 7- to 10-membered bicyclic heterocyclic aromatic ring which consists of carbon atoms and from 1 to 4 heteroatoms independently selected from the group consisting of N, O and S. In some embodiments the total number of S and O atoms in the aromatic heterocycle is not more than 1.

Examples of heterocycles include, but are not limited to, 1H-indazole, 2-pyrrolidonyl, 2H,6H-1,5,2-dithiazinyl, 2H-pyrrolyl, 3H-indolyl, 4-piperidonyl, 4alphaH-carbazole, 4H-quinolizinyl, 6H-1,2,5-thiadiazinyl, 5 acridinyl, azocinyl, benzimidazolyl, benzofuranyl, benzothiofuranyl, benzothiophenyl, benzoxazolyl, benzthiazolyl, benztriazolyl, benztetrazolyl, benzisoxazolyl, benzisothiazolyl, benzimidazalonyl, carbazolyl, 4alphaH-carbazolyl, beta-carbolinyl, chromanyl, chromenyl, cinnolinyl, decahydroquinolinyl, 2H,6H-1,5,2-dithiazinyl, dihydrofuro[2,3-beta]tetrahydrofuran, furanyl, furazanyl, imidazolidinyl, imidazolinyl, imidazolyl, 1H-indazolyl, indolenyl, indolinyl, indolizinyl, indolyl, isobenzofuranyl, isochromanyl, isoindazolyl, isoindolinyl, isoindolyl, isoquinolinyl, isothiazolyl, isoxazolyl, morpholinyl, naphthyridinyl, octahydroisoquinolinyl, oxadiazolyl, 1,2,3-oxadiazolyl, 1,2,4-oxadiazolyl, 1,2,5-oxadiazolyl, 1,3,4-oxadiazolyl, oxazolidinyl, oxazolyl, oxazolidinylperimidinyl, phenanthridinyl, phenanthrolinyl, phenarsazinyl, phenazinyl, phenothiazinyl, phenoxathiinyl, phenoxazinyl, phthalazinyl, piperazinyl, piperidinyl, pteridinyl, piperidonyl, 4-piperidonyl, pteridinyl, purinyl, pyranyl, pyrazinyl, pyrazolidinyl, pyrazolinyl, pyrazolyl, pyridazinyl, pyridooxazole, pyridoimidazole, pyridothiazole, pyridinyl, pyridyl, pyrimidinyl, pyrrolidinyl, pyrrolinyl, pyrrolyl, quinazolinyl, quinolinyl, 4H-quinolizinyl, quinoxalinyl, quinuclidinyl, carbolinyl, tetrahydrofuranyl, tetrahydroisoquinolinyl, tetrahydroquinolinyl, 6H-1,2,5-thiadiazinyl, 1,2,3-thiadiazolyl, 1,2,4-thiadiazolyl, 1,2,5-thiadiazolyl, 1,3,4-thiadiazolyl, thianthrenyl, thiazolyl, thienyl, thienothiazolyl, thienooxazolyl, thienoimidazolyl, thiophenyl, triazinyl, 1,2,3-triazolyl, 1,2,4-triazolyl, 1,2,5-triazolyl, 1,3,4-triazolyl, xanthenyl. Preferred heterocycles include, but are not limited to, pyridinyl, furanyl, thienyl, pyrrolyl, pyrazolyl, imidazolyl, indolyl, benzimidazolyl, 1H-indazolyl, oxazolidinyl, benzotriazolyl, benzisoxazolyl, oxindolyl, benzoxazolinyl, or isatinoyl. Also included are fused ring and spiro compounds containing, for example, the above heterocycles.

The Term "Independently Selected from", "Independently, at Each occurrence" or similar language, means that the labeled R substitution groups may appear more than once and may be the same or different when appearing multiple times in the same structure. Thus the $R^1$ may be the same or different than the $R^6$ and if the labeled $R^6$ substitution group appears four times in a given permutation of Formula I, then each of those labeled $R^6$ substitution groups may be, for example, a different alkyl group falling within the definition of $R^6$.

Polysiloxane/polyimide block copolymers comprise polysiloxane blocks and polyimide blocks. In random polysiloxane/polyimide block copolymers the size of the siloxane block is determined by the number of siloxy units (analogous to g in Formula (I)) in the monomer used to form the block copolymer. In some non-random polysiloxane/polyimide block copolymers the order of the polyimide blocks and polysiloxane blocks is determined but the size of the siloxane block is still determined by the number of siloxy units in the monomer. In contrast, the polysiloxane/polyimide block copolymers described herein have extended siloxane blocks. Two or more siloxane monomers are linked together to form an extended siloxane oligomer which is then used to form the block copolymer. Polysiloxane/polyimide block copolymers having extended siloxane blocks and a siloxane content of 5 weight percent to 30 weight percent, based on the total weight of the block copolymer, have surprisingly high impact strength.

Polysiloxane/polyimide block copolymers having extended siloxane blocks are made by forming an extended siloxane oligomer and then using the extended siloxane oligomer to make the block copolymer. The extended siloxane oligomer is made by reacting a diamino siloxane and a dianhydride wherein either the diamino siloxane or the dianhydride is present in 10 to 50% molar excess, or, more specifically, 10 to 25% molar excess. "Molar excess" as used in this context is defined as being in excess of the other reactant. For example, if the diamino siloxane is present in 10% molar excess then for 100 moles of dianhydride are present there are 110 moles of diamino siloxane.

Diamino siloxanes have formula (II)

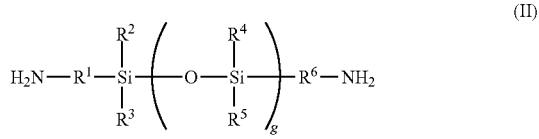

(II)

wherein $R^{1-6}$ and g are defined as above. In one embodiment $R^{2-5}$ are methyl groups and $R^1$ and $R^6$ are alkylene groups. The synthesis of diamino siloxanes is known in the art and is taught, for example, in U.S. Pat. Nos. 3,185,719 and 4,808,686. In one embodiment $R^1$ and $R^6$ are alkylene groups having 3 to 10 carbons. In some embodiments $R^1$ and $R^6$ are the same and in some embodiments $R^1$ and $R^6$ are different.

Dianhydrides useful for forming the extended siloxane oligomer have the Formula (III)

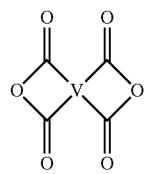

(III)

wherein V is a tetravalent linker as described above. Suitable substitutions and/or linkers include, but are not limited to, carbocyclic groups, aryl groups, ethers, sulfones, sulfides amides, esters, and combinations comprising at least one of the foregoing. Exemplary linkers include, but are not limited to, tetravalent aromatic radicals of Formula (IV), such as:

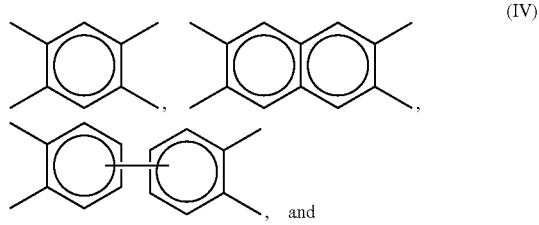

(IV)

, and

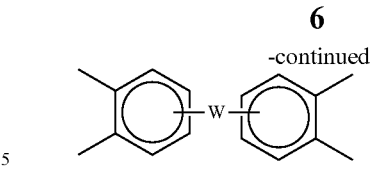

-continued wherein W is a divalent moiety such as O, S, C(O)—, —SO$_2$—, —SO—, —C$_y$H$_{2y}$— (y being an integer of 1 to 20), and halogenated derivatives thereof, including perfluoroalkylene groups, or a group of the Formula —O—Z—O— wherein the divalent bonds of the —O— or the —O—Z—O— group are in the 3,3',3,4',4,3', or the 4,4' positions, and wherein Z includes, but is not limited to, divalent moieties of Formula (V).

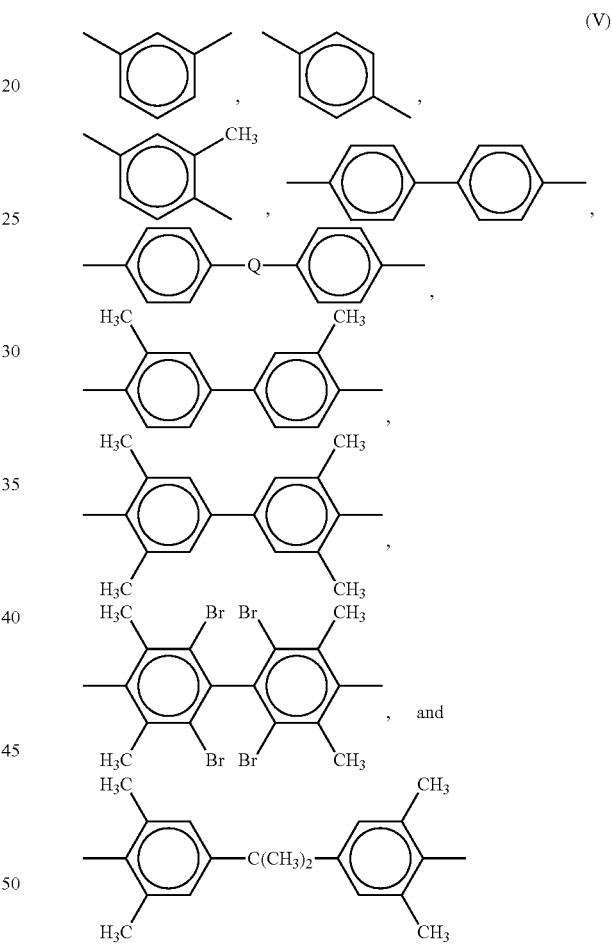

(V)

wherein Q includes, but is not limited to, a divalent moiety comprising —O—, —S—, —C(O)—, —SO$_2$—, —SO—, —C$_y$H$_{2y}$— (y being an integer from 1 to 20), and halogenated derivatives thereof, including perfluoroalkylene groups. In some embodiments the tetravalent linker V is free of halogens.

In one embodiment, the dianhydride comprises an aromatic bis(ether anhydride). Examples of specific aromatic bis(ether anhydride)s are disclosed, for example, in U.S. Pat. Nos. 3,972,902 and 4,455,410. Illustrative examples of aromatic bis(ether anhydride)s include: 2,2-bis[4-(3,4-dicarboxyphenoxy)phenyl]propane dianhydride; 4,4'-bis(3,4-dicarboxyphenoxy)diphenyl ether dianhydride; 4,4'-bis(3,4- dicarboxyphenoxy)diphenyl sulfide dianhydride; 4,4'-bis(3,4-dicarboxyphenoxy)benzophenone dianhydride; 4,4'-bis(3,4-dicarboxyphenoxy)diphenyl sulfone dianhydride; 2,2-bis[4-(2,3-dicarboxyphenoxy)phenyl]propane dianhydride; 4,4'-bis(2,3-dicarboxyphenoxy)diphenyl ether dianhydride; 4,4'-bis(2,3-dicarboxyphenoxy)diphenyl sulfide dianhydride; 4,4'-bis(2,3-dicarboxyphenoxy)benzophenone dianhydride; 4,4'-bis(2,3-dicarboxyphenoxy)diphenyl sulfone dianhydride; 4-(2,3-dicarboxyphenoxy)-4'-(3,4-dicarboxyphenoxy)diphenyl-2,2-propane dianhydride; 4-(2,3-dicarboxyphenoxy)-4'-(3,4-dicarboxyphenoxy)diphenyl ether dianhydride; 4-(2,3-dicarboxyphenoxy)-4'-(3,4-dicarboxyphenoxy)diphenyl sulfide dianhydride; 4-(2,3-dicarboxyphenoxy)-4'-(3,4-dicarboxyphenoxy)benzophenone dianhydride and 4-(2,3-dicarboxyphenoxy)-4'-(3,4-dicarboxyphenoxy)diphenyl sulfone dianhydride, as well as mixtures comprising at least two of the foregoing.

The bis(ether anhydride)s can be prepared by the hydrolysis, followed by dehydration, of the reaction product of a nitro substituted phenyl dinitrile with a metal salt of dihydric phenol compound in the presence of a dipolar, aprotic solvent.

A chemical equivalent to a dianhydride may also be used. Examples of dianhydride chemical equivalents include tetrafunctional carboxylic acids capable of forming a dianhydride and ester or partial ester derivatives of the tetra functional carboxylic acids. Mixed anhydride acids or anhydride esters may also be used as an equivalent to the dianhydride. As used throughout the specification and claims "dianhydride" will refer to dianhydrides and their chemical equivalents.

The diamino siloxane and dianhydride can be reacted in a suitable solvent, such as a halogenated aromatic solvent, for example orthodichlorobenzene, optionally in the presence of a polymerization catalyst such as an alkali metal aryl phosphinate or alkali metal aryl phosphonate, for example, sodium phenylphosphonate. In some instances the solvent will be an aprotic polar solvent with a molecular weight less than or equal to 500 to facilitate removal of the solvent from the polymer. The temperature of the reaction can be greater than or equal to 100° C. and the reaction may run under azeotropic conditions to remove the water formed by the reaction. In some embodiments the polysiloxane/polyimide block copolymer has a residual solvent content less than or equal to 500 parts by weight of solvent per million parts by weight of polymer (ppm), or, more specifically, less than or equal to 250 ppm, or, even more specifically, less than or equal to 100 ppm. Residual solvent content may be determined by a number of methods including, for example, gas chromatography.

The stoichiometric ratio of the diamino siloxane and dianhydride in the reaction to form the siloxane oligomer determines the degree of chain extension, (d in Formula (I)+1) in the extended siloxane oligomer. For example, a stoichiometric ratio of 4 diamino siloxane to 6 dianhydride will yield a siloxane oligomer with a value for d+1 of 4. As understood by one of ordinary skill in the art, d+1 is an average value for the siloxane containing portion of the block copolymer and the value for d+1 is generally rounded to the nearest whole number. For example a value for d+1 of 4 includes values of 3.5 to 4.5.

In some embodiments d is less than or equal to 50, or, more specifically, less than or equal to 25, or, even more specifically, less than or equal to 10.

The extended siloxane oligomers described above are further reacted with non-siloxane diamines and additional dianhydrides to make the polysiloxane/polyimide block copolymer. The overall molar ratio of the total amount of dianhydride and diamine (the total of both the siloxane and non-siloxane containing diamines) used to make the polysiloxane/polyimide block copolymer should be about equal so that the copolymer can polymerize to a high molecule weight. In some embodiments the ratio of total diamine to total dianhydride is 0.9 to 1.1, or, more specifically 0.95 to 1.05. In some embodiments the polysiloxane/polyimide block copolymer will have a number average molecular weight (Mn) of 5,000 to 50,000 Daltons, or, more specifically, 10,000 to 30,000 Daltons. The additional dianhydride may be the same or different from the dianhydride used to form the extended siloxane oligomer.

The non-siloxane polyimide block comprises repeating units having the general Formula (IX):

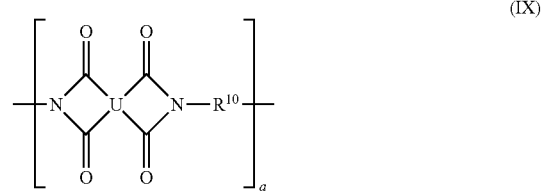

wherein a is more than 1, typically 10 to 1,000 or more, and can specifically be 10 to 500; and wherein U is a tetravalent linker without limitation, as long as the linker does not impede synthesis of the polyimide oligomer. Suitable linkers include, but are not limited to: (a) substituted or unsubstituted, saturated, unsaturated or aromatic monocyclic and polycyclic groups having 5 to 50 carbon atoms, (b) substituted or unsubstituted, linear or branched, saturated or unsaturated alkyl groups having 1 to 30 carbon atoms; and combinations comprising at least one of the foregoing linkers. Suitable substitutions and/or linkers include, but are not limited to, carbocyclic groups, aryl groups, ethers, sulfones, sulfides amides, esters, and combinations comprising at least one of the foregoing. Exemplary linkers include, but are not limited to, tetravalent aromatic radicals of Formula (IV), such as:

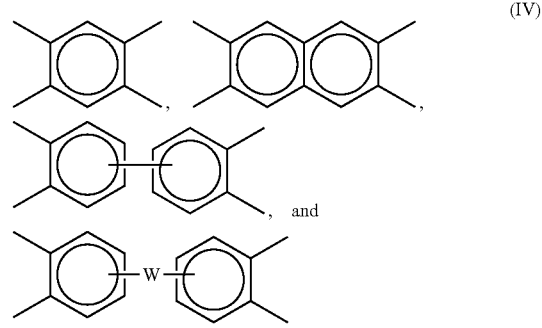

wherein W is a divalent moiety such as O, S, C(O)—, —$SO_2$—, —SO—, —$C_yH_{2y}$— (y being an integer of 1 to 20), and halogenated derivatives thereof, including perfluoroalkylene groups, or a group of the Formula —O—Z—O— wherein the divalent bonds of the —O— or the —O—Z—O— group are in the 3,3',3,4',4,3', or the 4,4' positions, and wherein Z includes, but is not limited to, divalent moieties of Formula (V).

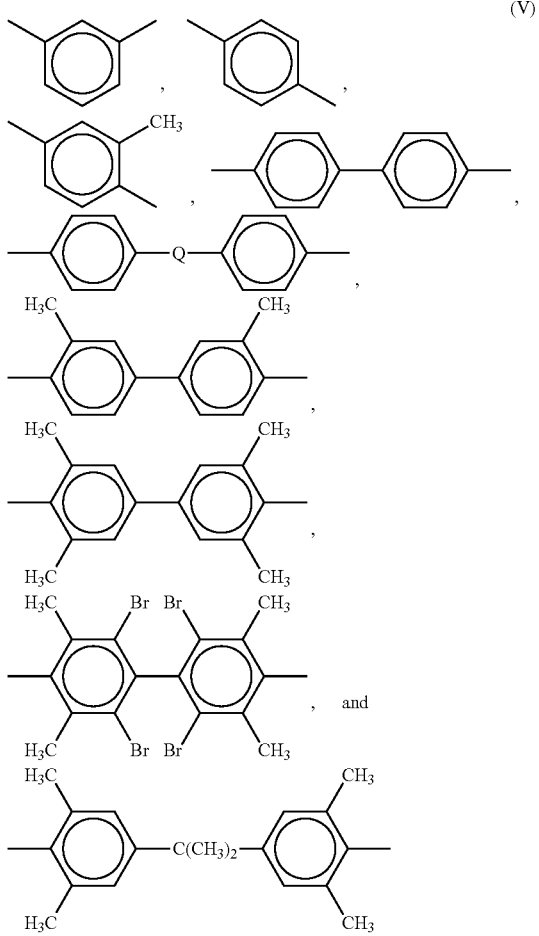

(V)

wherein Q includes, but is not limited to, a divalent moiety comprising —O—, —S—, —C(O)—, —SO$_2$—, —SO—, —C$_y$H$_{2y}$— (y being an integer from 1 to 20), and halogenated derivatives thereof, including perfluoroalkylene groups. In some embodiments the tetravalent linker U is free of halogens.

In some embodiments V in the polysiloxane block and U in the polyimide block are the same. In some embodiments V and U are different.

R$^{10}$ in formula (IX) includes, but is not limited to, substituted or unsubstituted divalent organic moieties such as: aromatic hydrocarbon moieties having 6 to 20 carbons and halogenated derivatives thereof; straight or branched chain alkylene moieties having 2 to 20 carbons; cycloalkylene moieties having 3 to 20 carbon atom; or divalent moieties of the general formula (VIII)

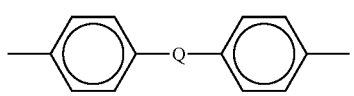

(VIII)

wherein Q is defined as above. In some embodiments R$^9$ and R$^{19}$ are the same and in some embodiments R$^9$ and R$^{19}$ are different.

In some embodiments the polysiloxane/polyimide block copolymer is halogen free. Halogen free is defined as having a halogen content less than or equal to 1000 parts by weight of halogen per million parts by weight of block copolymer (ppm). The amount of halogen can be determined by ordinary chemical analysis such as atomic absorption. Halogen free polymers will further have combustion products with low smoke corrosivity, for example as determined by DIN 57472 part 813. In some embodiments smoke conductivity, as judged by the change in water conductivity can be less than or equal to 1000 micro Siemens. In some embodiments the smoke has an acidity, as determined by pH, greater than or equal to 5.

In one embodiment the non-siloxane polyimide blocks comprise a polyetherimide block. Polyetherimide blocks comprise repeating units of Formula (X):

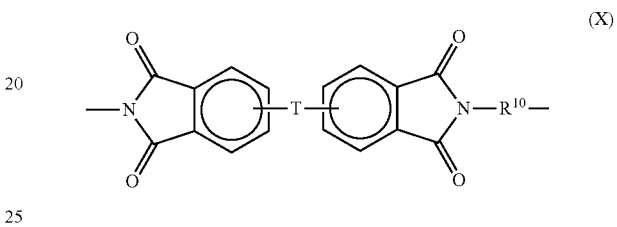

(X)

wherein T is —O— or a group of the Formula —O—Z—O— wherein the divalent bonds of the —O— or the —O—Z—O— group are in the 3,3',3,4',4,3', or the 4,4' positions, and wherein Z and R$^{10}$ are defined as described above.

The polyetherimide block can comprise structural units according to Formula (X) wherein each R$^{10}$ is independently derived from p-phenylene, m-phenylene, diamino aryl sulfone or a mixture thereof and T is a divalent moiety of the Formula (XI):

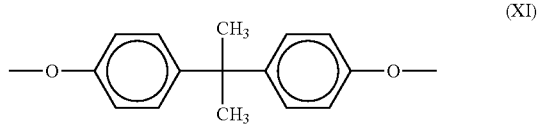

(XI)

Included among the many methods of making the polyimide oligomer, particularly polyetherimide oligomers, are those disclosed in U.S. Pat. Nos. 3,847,867; 3,850,885; 3,852,242; 3,855,178; 3,983,093; and 4,443,591.

The repeating units of Formula (IX) and Formula (X) are formed by the reaction of a dianhydride and a diamine. Dianhydrides useful for forming the repeating units have the Formula (XII)

(XII)

wherein U is as defined above. As mentioned above the term dianhydrides includes chemical equivalents of dianhydrides.

In one embodiment, the dianhydride comprises an aromatic bis(ether anhydride). Examples of specific aromatic bis(ether anhydride)s are disclosed, for example, in U.S. Pat. Nos. 3,972,902 and 4,455,410. Illustrative examples of aromatic bis(ether anhydride)s include: 2,2-bis[4-(3,4-dicarboxyphenoxy)phenyl]propane dianhydride; 4,4'-bis(3,4-dicarboxyphenoxy)diphenyl ether dianhydride; 4,4'-bis(3,4-dicarboxyphenoxy)diphenyl sulfide dianhydride; 4,4'-bis(3,4-dicarboxyphenoxy)benzophenone dianhydride; 4,4'-bis(3,4-dicarboxyphenoxy)diphenyl sulfone dianhydride; 2,2-bis[4-(2,3-dicarboxyphenoxy)phenyl]propane dianhydride; 4,4'-bis(2,3-dicarboxyphenoxy)diphenyl ether dianhydride; 4,4'-bis(2,3-dicarboxyphenoxy)diphenyl sulfide dianhydride; 4,4'-bis(2,3-dicarboxyphenoxy)benzophenone dianhydride; 4,4'-bis(2,3-dicarboxyphenoxy)diphenyl sulfone dianhydride; 4-(2,3-dicarboxyphenoxy)-4'-(3,4-dicarboxyphenoxy)diphenyl-2,2-propane dianhydride; 4-(2,3-dicarboxyphenoxy)-4'-(3,4-dicarboxyphenoxy)diphenyl ether dianhydride; 4-(2,3-dicarboxyphenoxy)-4'-(3,4-dicarboxyphenoxy)diphenyl sulfide dianhydride; 4-(2,3-dicarboxyphenoxy)-4'-(3,4-dicarboxyphenoxy)benzophenone dianhydride and 4-(2,3-dicarboxyphenoxy)-4'-(3,4-dicarboxyphenoxy)diphenyl sulfone dianhydride, as well as mixtures comprising at least two of the foregoing.

Diamines useful for forming the repeating units of Formula (IX) and (X) have the Formula (XIII)

$$H_2N-R^{10}-NH_2 \quad (XIII)$$

wherein $R^{10}$ is as defined above. Examples of specific organic diamines are disclosed, for example, in U.S. Pat. Nos. 3,972,902 and 4,455,410. Exemplary diamines include ethylenediamine, propylenediamine, trimethylenediamine, diethylenetriamine, triethylenetertramine, hexamethylenediamine, heptamethylenediamine, octamethylenediamine, nonamethylenediamine, decamethylenediamine, 1,12-dodecanediamine, 1,18-octadecanediamine, 3-methylheptamethylenediamine, 4,4-dimethylheptamethylenediamine, 4-methylnonamethylenediamine, 5-methylnonamethylenediamine, 2,5-dimethylhexamethylenediamine, 2,5-dimethylheptamethylenediamine, 2,2-dimethylpropylenediamine, N-methyl-bis(3-aminopropyl)amine, 3-methoxyhexamethylenediamine, 1,2-bis(3-aminopropoxy)ethane, bis(3-aminopropyl)sulfide, 1,4-cyclohexanediamine, bis-(4-aminocyclohexyl)methane, m-phenylenediamine, p-phenylenediamine, 2,4-diaminotoluene, 2,6-diaminotoluene, m-xylylenediamine, p-xylylenediamine, 2-methyl-4,6-diethyl-1,3-phenylene-diamine, 5-methyl-4,6-diethyl-1,3-phenylene-diamine, benzidine, 3,3'-dimethylbenzidine, 3,3'-dimethoxybenzidine, 1,5-diaminonaphthalene, bis(4-aminophenyl)methane, bis(2-chloro-4-amino-3,5-diethylphenyl)methane, bis(4-aminophenyl)propane, 2,4-bis(p-amino-t-butyl)toluene, bis(p-amino-t-butylphenyl)ether, bis(p-methyl-o-aminophenyl)benzene, bis(p-methyl-o-aminopentyl)benzene, 1,3-diamino-4-isopropylbenzene, bis(4-aminophenyl)sulfide, bis(4-aminophenyl)sulfone, bis(4-aminophenyl)ether and 1,3-bis(3-aminopropyl)tetramethyldisiloxane. Mixtures of these compounds may also be used. In one embodiment the diamine is an aromatic diamine, or, more specifically, m-phenylenediamine, p-phenylenediamine, sulfonyl dianiline and mixtures thereof.

In general, the reactions can be carried out employing various solvents, e.g., o-dichlorobenzene, m-cresol/toluene, and the like, to effect a reaction between the dianhydride of Formula (XII) and the diamine of Formula (XIII), at temperatures of 100° C. to 250° C. Alternatively, the polyimide block or polyetherimide block can be prepared by melt polymerization or interfacial polymerization, e.g., melt polymerization of an aromatic bis(ether anhydride) and a diamine by heating a mixture of the starting materials to elevated temperatures with concurrent stirring. Generally, melt polymerizations employ temperatures of 200° C. to 400° C.

A chain-terminating agent may be employed to control the molecular weight of the polysiloxane/polyimide block copolymer. Mono-functional amines such as aniline, or mono-functional anhydrides such as phthalic anhydride may be employed.

The polysiloxane/polyimide block copolymer may be made by first forming the extended siloxane oligomer and then further reacting the extended siloxane oligomer with non-siloxane diamine and dianhydride. Alternatively a non-siloxane diamine and dianhydride may be reacted to form a polyimide oligomer. The polyimide oligomer and extended siloxane oligomer can be reacted to form the polysiloxane/polyimide block copolymer.

When using a polyimide oligomer and an extended siloxane oligomer to form the block copolymer, the stoichiometric ratio of terminal anhydride functionalities to terminal amine functionalities is 0.90 to 1.10, or, more specifically, 0.95 to 1.05. In one embodiment the extended siloxane oligomer is amine terminated and the non-siloxane polyimide oligomer is anhydride terminated. In another embodiment, the extended siloxane oligomer is anhydride terminated and the non-siloxane polyimide oligomer is amine terminated. In another embodiment, the extended siloxane oligomer and the non-siloxane polyimide oligomer are both amine terminated and they are both reacted with a sufficient amount of dianhydride (as described above) to provide a copolymer of the desired molecular weight. In another embodiment, the extended siloxane oligomer and the non-siloxane polyimide oligomer are both anhydride terminated and they are both reacted with a sufficient amount of diamine (as described above) to provide a copolymer of the desired molecular weight. Reactions conditions for the polymerization of the siloxane and polyimide oligomers are similar to those required for the formation of the oligomers themselves and can be determined without undue experimentation by one of ordinary skill in the art.

The siloxane content in the block copolymer is determined by the amount of extended siloxane oligomer used during polymerization. The siloxane content can be 5 to 30 weight percent, or, more specifically, 10 to 25 weight percent, based on the total weight of the block copolymer. The siloxane content is calculated using the molecular weight of the diamino siloxane used to form the extended siloxane oligomer.

Polysiloxane/polyimide block copolymers having a siloxane content of 5 to 30 weight percent, based on the total weight of the block copolymer and comprising repeating units of Formula (I) have a surprisingly high impact strength when compared to comparable polysiloxane/polyimide copolymers having a siloxane content greater than 30 weight percent and comprising repeating units of Formula (I). The notched Izod strength at room temperature can be greater than 267 Joules per meter (J/m), or, more specifically, greater than or equal to 374 J/m. In some embodiments the notched Izod is 267 to 1335 J/m (5 to 25 ft-lbf/in), or more specifically, 374 J/m to 1068 J/m (7 to 20 ft-lbf/in). Notched Izod impact can be determined by several methods known in the art, including for example ASTM D 256 using injection molded bars having a thickness of 3.2 millimeters.

In one embodiment, the polysiloxane/polyimide block copolymer has a siloxane content of 5 to 30 weight percent, or, more specifically, 10 to 25 weight percent, based on the total weight of the block copolymer and comprises repeating units of Formula (I) wherein d+1 has a value of 3 to 10, or, more specifically, 3 to 6.

In some embodiments, especially in demanding electronic applications, such as the fabrication of computer chips and the manipulation of silicone wafers, it is desirable to have polysiloxane/polyimide block copolymer or blend of polysiloxane/polyimide block copolymers with low metal ion content. In some embodiments the amount of metal ions is less than or equal to 1000 parts per million parts of copolymer (ppm), or, more specifically, less than or equal to 500 ppm or, even more specifically, the metal ion content will be less than or equal to 100 ppm. Alkali and alkaline earth metal ions are of particular concern. In some embodiments the amount of alkali and alkaline earth metal ions is less than or equal to 1000 ppm in the high impact polysiloxane/polyimide block copolymer and wires or cables made from them.

Two or more polysiloxane/polyimide block copolymers may be melt blended to form a thermoplastic composition. The block copolymers may be used in any proportion. For example, when two block copolymers are used the weight ratio of the first block copolymer to the second block copolymer may be 1 to 99. Ternary blends and higher are also contemplated.

The thermoplastic composition may have a residual solvent content less than or equal to 500 parts by weight of solvent per million parts by weight of composition (ppm), or, more specifically, less than or equal to 250 ppm, or, even more specifically, less than or equal to 100 ppm.

In some embodiments the thermoplastic composition is halogen free. Halogen free is defined as having a halogen content less than or equal to 1000 parts by weight of halogen per million parts by weight of thermoplastic composition (ppm). The amount of halogen can be determined by ordinary chemical analysis such as atomic absorption. Halogen free thermoplastic compositions will further have combustion products with low smoke corrosivity, for example as determined by DIN 57472 part 813. In some embodiments smoke conductivity, as judged by the change in water conductivity can be less than or equal to 1000 micro Siemens. In some embodiments the smoke has an acidity, as determined by pH, greater than or equal to 5.

In some embodiments the amount of metal ions in the thermoplastic composition is less than or equal to 1000 parts by weight of metal ions per million parts by weight of thermoplastic composition (ppm), or, more specifically, less than or equal to 500 ppm or, even more specifically, the metal ion content is less than or equal to 100 ppm. Alkali and alkaline earth metal ions are of particular concern. In some embodiments the amount of alkali and alkaline earth metal ions is less than or equal to 1000 ppm in the thermoplastic composition and wires or cables made from them.

In some embodiments the block copolymers used in the thermoplastic composition may have a degree of chain extension, d+1, of 3 to 10, or, more specifically, 3 to 6.

In some embodiments, a thermoplastic composition comprises a first polysiloxane/polyimide block copolymer having a first siloxane content, based on the total weight of the first block copolymer, and comprising repeating units of Formula (I); and a second polysiloxane/polyimide block copolymer having a second siloxane content, based on the total weight of the second block copolymer, and comprising repeating units of Formula (I) wherein the first siloxane content does not equal the second siloxane content. By melt blending two or more polysiloxane/polyimide block copolymers with different siloxane contents compositions with intermediate siloxane contents can be made predictably and reliably. Additionally, blending two block copolymers with different siloxane contents yields compositions with unexpected impact strength.

In one embodiment a thermoplastic composition comprises two polysiloxane/polyimide block copolymers both comprising repeating units of Formula (I). The polysiloxane/polyimide block copolymers have different siloxane contents and different degrees of chain extension for the polysiloxane block (d+1). In another embodiment a thermoplastic composition comprises two polysiloxane/polyimide block copolymers both comprising repeating units of Formula (I). The polysiloxane/polyimide block copolymers have different siloxane contents but the same degree of chain extension for the polysiloxane block (d+1).

In one embodiment, a thermoplastic composition comprises a first polysiloxane/polyimide block copolymer having a first siloxane content, based on the total weight of the first block copolymer, and comprising repeating units of Formula (I); and a second polysiloxane/polyimide block copolymer having a second siloxane content, based on the total weight of the second block copolymer, and comprising repeating units of Formula (I) wherein the first siloxane content equals the second siloxane content and the value of d for the first polysiloxane/polyimide block copolymer does not equal the value of d for the second polysiloxane/polyimide block copolymer. These blends are visually clear.

The blending of polysiloxane/polyimide block copolymer provides a useful method to control the properties of the polysiloxane/polyimide block copolymer blend by, in some instances, attaining a property intermediate of the properties of the component polysiloxane/polyimide block copolymers. For example combining a high and low modulus polysiloxane/polyimide block copolymers gives a blend of intermediate modulus. In some embodiments copolymers of different molecular weights may be combined to produce a blend having a melt flow value needed in subsequent extrusion and molding operations. In terms of Izod impact such blends give surprisingly high impact strength.

The blends may further contain fillers and reinforcements for example fiber glass, milled glass, glass beads, flake and the like. Minerals such as talc, wollastonite, mica, kaolin or montmorillonite clay, silica, quartz, barite, and combinations of two or more of the foregoing may be added. The compositions can comprise inorganic fillers, such as, for example, carbon fibers and nanotubes, metal fibers, metal powders, conductive carbon, and other additives including nano-scale reinforcements as well as combinations of inorganic fillers.

Other additives include, UV absorbers; stabilizers such as light stabilizers and others; lubricants; plasticizers; pigments; dyes; colorants; anti-static agents; foaming agents; blowing agents; metal deactivators, and combinations comprising one or more of the foregoing additives. Antioxidants can be compounds such as phosphites, phosphonites and hindered phenols or mixtures thereof. Phosphorus containing stabilizers including triaryl phosphite and aryl phosphonates are of note as useful additives. Difunctional phosphorus containing compounds can also be employed. Stabilizers may have a molecular weight greater than or equal to 300. In some embodiments, phosphorus containing stabilizers with a molecular weight greater than or equal to 500 are useful. Phosphorus containing stabilizers are typically present in the composition at 0.05-0.5% by weight of the formulation. Flow aids and mold release compounds are also contemplated.

The thermoplastic composition can be prepared melt mixing or a combination of dry blending and melt mixing. Melt mixing can be performed in single or twin screw type extruders or similar mixing devices which can apply a shear and heat to the components. Melt mixing can be performed at temperatures greater than or equal to the melting temperatures of the block copolymers and less than the degradation temperatures of either of the block copolymers.

All of the ingredients may be added initially to the processing system. In some embodiments, the ingredients may be added sequentially or through the use of one or more master batches. It can be advantageous to apply a vacuum to the melt through one or more vent ports in the extruder to remove volatile impurities in the composition.

In one embodiment the composition comprises a reaction product of melt mixing the block copolymers.

In some embodiments melt mixing is performed using an extruder and the composition exits the extruder in a strand or multiple strands. The shape of the strand is dependent upon the shape of the die used and has no particular limitation.

In one embodiment, a conductive wire comprises a conductor and a covering disposed over the conductor. The covering comprises a thermoplastic composition and the thermoplastic composition comprises two polysiloxane/polyimide block copolymers as described above. The composition is applied to the conductor by a suitable method such as extrusion coating to form a conductive wire. For example, a coating extruder equipped with a screw, crosshead, breaker plate, distributor, nipple, and die can be used. The melted thermoplastic composition forms a covering disposed over a circumference of the conductor. Extrusion coating may employ a single taper die, a double taper die, other appropriate die or combination of dies to position the conductor centrally and avoid die lip build up.

In some embodiments it may be useful to dry the thermoplastic composition before extrusion coating. Exemplary drying conditions are 60 to 90° C. for 2 to 20 hours. Additionally, in one embodiment, during extrusion coating, the thermoplastic composition is melt filtered, prior to formation of the coating, through one or more filters. In some embodiments the thermoplastic composition will have substantially no particles greater than 80 micrometers in size. In some embodiments any particulates present will be less than or equal to 40 micrometers in size. In some embodiments there will be substantially no particulates greater than 20 micrometers in size. The presence and size of particulates can be determined using a solution of 1 gram of thermoplastic composition dissolved in 10 milliliters of a solvent, such as chloroform, and analyzing it using microscopy or light scattering techniques. Substantially no particulates is defined as having less than or equal to 3 particulates, or, more specifically, less than or equal to 2 particulates, or, even more specifically, less than or equal to 1 particulate per one gram sample. Low levels of particulates are beneficial for giving a layer of insulation on a conductive wire that will not have electrically conductive defects as well as giving coatings with improved mechanical properties, for instance elongation.

The extruder temperature during extrusion coating is generally less than the degradation temperature of the block copolymers. Additionally the processing temperature is adjusted to provide a sufficiently fluid molten composition to afford a covering for the conductor, for example, higher than the softening point of the thermoplastic composition, or more specifically at least 30° C. higher than the melting point of the thermoplastic composition.

After extrusion coating the conductive wire is usually cooled using a water bath, water spray, air jets or a combination comprising one or more of the foregoing cooling methods. Exemplary water bath temperatures are 20 to 85° C.

In one embodiment, the composition is applied to the conductor to form a covering disposed over and in physical contact with the conductor. Additional layers may be applied to the covering. Methods of coating a conductor which may be used are well known in the art and are discussed for example in U.S. Pat. Nos. 4,588,546 to Feil et al.; 4,038,237 to Snyder et al.; 3,986,477 to Bigland et al.; and, 4,414,355 to Pokorny et al.

In one embodiment the composition is applied to a conductor having one or more intervening layers between the conductor and the covering to form a covering disposed over the conductor. For instance, an optional adhesion promoting layer may be disposed between the conductor and covering. In another example the conductor may be coated with a metal deactivator prior to applying the covering. Alternatively, a metal deactivator can be mixed with the polysiloxane/polyimide block copolymers. In another example the intervening layer comprises a thermoplastic or thermoset composition that, in some cases, is foamed.

The conductor may comprise a single strand or a plurality of strands. In some cases, a plurality of strands may be bundled, twisted, braided, or a combination of the foregoing to form a conductor. Additionally, the conductor may have various shapes such as round or oblong. Suitable conductors include, but are not limited to, copper wire, aluminum wire, lead wire, and wires of alloys comprising one or more of the foregoing metals. The conductor may also be coated with, e.g., tin, gold or silver. In some embodiments the conductor comprises optical fibers.

The cross-sectional area of the conductor and thickness of the covering may vary and is typically determined by the end use of the conductive wire. The conductive wire can be used as conductive wire without limitation, including, for example, for harness wire for automobiles, wire for household electrical appliances, wire for electric power, wire for instruments, wire for information communication, wire for electric cars, as well as ships, airplanes, and the like.

In some embodiments the covering may have a thickness of 0.01 to 10 millimeters (mm) or, more specifically, 0.05 to 5 mm, or, even more specifically 1 to 3 mm.

Figure 2:
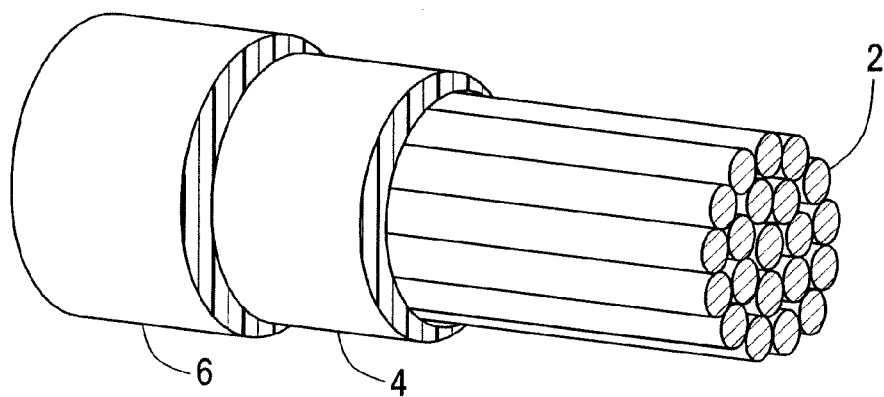
FIGS. 2 and 3 are perspective views of a conductive wire having multiple layers.
Figure 3:
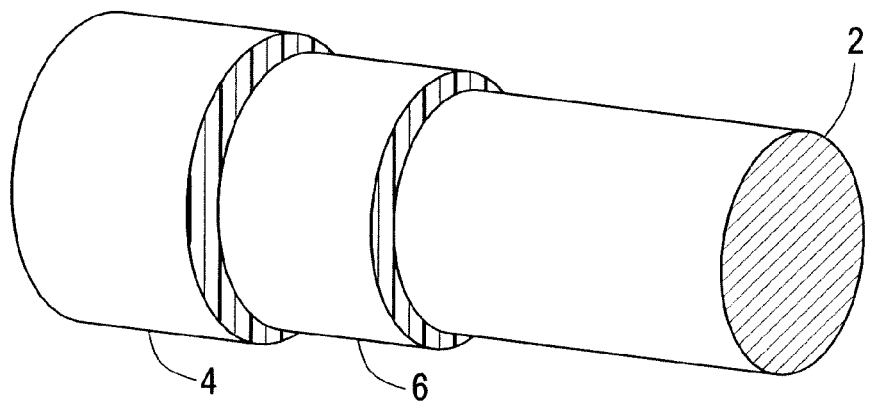

A cross-section of an exemplary conductive wire is seen in FIG. 1. FIG. 1 shows a covering, 4, disposed over a conductor, 2. In one embodiment, the covering, 4, comprises a foamed thermoplastic composition. Perspective views of exemplary conductive wires are shown in FIGS. 2 and 3. FIG. 2 shows a covering, 4, disposed over a conductor, 2, comprising a plurality of strands and an optional additional layer, 6, disposed over the covering, 4, and the conductor, 2. In one embodiment, the covering, 4, comprises a foamed thermoplastic composition. Conductor, 2, can also comprise a unitary conductor. FIG. 3 shows a covering, 4, disposed over a unitary conductor, 2, and an intervening layer, 6. In one embodiment, the intervening layer, 6, comprises a foamed composition. Conductor, 2, can also comprise a plurality of strands.

Multiple conductive wires may be combined to form a cable. The cable may comprise additional protective elements, structural elements, or a combination thereof. An exemplary protective element is a jacket which surrounds the group of conductive wires. The jacket and the covering on the conductive wires, singly or in combination, may comprise the thermoplastic composition described herein. A structural element is a typically non conductive portion which provides additional stiffness, strength, shape retention capability or the like.

A color concentrate or master batch may be added to the composition prior to or during extrusion coating. When a color concentrate is used it is typically present in an amount less than or equal to 3 weight percent, based on the total weight of the composition. In one embodiment the master batch comprises a polysiloxane/polyimide block copolymer.

Further information is provided by the following non-limiting examples.

EXAMPLES

Preparation of Polysiloxane/Polyimide Block Copolymer 1 (BC1)

Preparation of extended siloxane oligomer for BC1. A mixture of 1158 liters (306 gallons) of o-dichlorobenzene (oDCB) was combined with 166 kilograms (465 pounds) of bisphenol A dianhydride (BPADA) and 295 kilograms (650 pounds) of a diamino propyl capped methyl siloxane having 10 repeating siloxane units (G10) and 2 kilograms (4.7 pounds) phthalic anhydride. The G10 diamino siloxane had an average molecular weight of about 867. This mixture was heated with stirring to about 180° C. with the removal of water.

The extended siloxane oligomer solution was then mixed with 204 kilograms (449.8 pounds) of BPADA, 51 kilograms (112.1 pounds) of m-phenylene diamine (mPD) and 2 kilograms (4.7 pounds) of phthalic anhydride which had been dissolved in 568 liters (150 gallons) of oDCB. The mixture was heated with removal of water until imidization was essentially completed. The temperature was raised above 180° C. and most of the oDCB solvent was distilled off. The polymer mixture was then passed through two wiped film evaporators at 200 to 320° C. to reduce the oDCB content to below 500 ppm. The polymer was pumped from the wiped film evaporator through a die which formed it into continuous strands. The strands were cooled in a water bath and chopped into pellets. Mn was 26,000 Daltons; weight average molecular weight (Mw) was 90,000 Daltons as determined using gel permeation chromatography (GPC) as per ASTM method D5296. The melt flow rate at 295° C., using a 6.6 kilogram weight, was 27 grams/10 minutes.

Preparation of Polysiloxane/Polyimide Block Copolymer BC2

Preparation of extended siloxane oligomer. A mixture of 712 liters (188 gallons) of oDCB was combined with 131 kilograms (289 pounds) of BPADA and 170 kilograms (374 pounds) of a diamino propyl capped methyl siloxane having 10 repeating siloxane units (G10) and 3.5 kilograms (7.8 pounds) phthalic anhydride. The G10 diamino siloxane had an average molecular weight of about 897. This mixture was heated with stirring to about 180° C. with the removal of water.

The extended siloxane oligomer solution was then mixed with 407 kilograms (898 pounds) of BPADA, 93 kilograms (205 pounds) of m-phenylene diamine (mPD) and 3.5 kilograms (7.8 pounds) of phthalic anhydride which had been dissolved in 1181 liters (312 gallons) of oDCB. The mixture was heated with removal of water until imidization was essentially complete. The temperature was raised above 180° C. and most of the oDCB was distilled off. The polymer mixture was then passed through two wiped film evaporators at 200 to 320° C. to reduce the oDCB content to below 500 ppm. The polymer was pumped from the wiped film evaporator through a die which formed it into continuous strands. The strands were cooled in a water bath and chopped into pellets. Mn was 14,600 Daltons; Mw was 44,000 Daltons as determined using gel permeation chromatography (GPC) as per ASTM method D5296. The melt flow rate at 295° C., using a 6.6 kilogram weight, was 3.3 grams/10 minutes.

Preparation of Polysiloxane/Polyimide Block Copolymer BC3

Preparation of extended siloxane oligomer. A mixture of 848 liters (224 gallons) of oDCB was combined with 227 kilograms (500 pounds) of BPADA and 140 kilograms (309 pounds) of a diamino propyl capped methyl siloxane having 10 repeating siloxane units (G10). The G10 diamino siloxane had an average molecular weight of about 897. This mixture was heated with stirring to about 180° C. with the removal of water.

The extended siloxane oligomer solution was then mixed with 227 kilograms (500 pounds) of BPADA, 78 kilograms (173 pounds) of mPD and 5.6 kilograms (12.3 pounds) of phthalic anhydride which had been dissolved in 662 liters (175 gallons) of oDCB. This mixture was heated with removal of water until imidization was essentially complete. The temperature was raised above 180° C. and most of the oDCB solvent was distilled off. The polymer mixture was then passed through two wiped film evaporators at 200 to 320° C. to reduce the oDCB content to below 500 ppm. The polymer was pumped from the wiped film evaporator through a die which formed it into continuous strands. The strands were cooled in a water bath and chopped into pellets. Mn was 14,500 Daltons; Mw was 43,000 Daltons as determined using gel permeation chromatography (GPC) as per ASTM method D5296. The melt flow rate at 295° C., using a 6.6 kilogram weight, was 7.1 grams/10 minutes.

In the following examples three polysiloxane/polyimide block copolymers as prepared above were used. All three block copolymers are polysiloxane/polyetherimide block copolymers and were made using extended siloxane oligomers. Details are provided in Table 1. The siloxane content includes total functionality of the diamino alkyl siloxane incorporated into the copolymer.

TABLE 1

|  | Siloxane content | Degree of chain extension (d + 1) |
|---|---|---|
| BC 1 | 39.8 weight percent | 4 |
| BC 2 | 22.9 weight percent | 4 |
| BC 3 | 21.6 weight percent | 2 |

The polysiloxane/polyimide block copolymers and blends of the block copolymers were tested for glass transition temperature (Tg) by differential scanning calorimetry (DSC) in a nitrogen atmosphere; results are in ° C. Heat distortion temperature (HDT) was determined by ASTM D 648 at 0.46 Megapascals (Mpa) (66 pounds per square inch (psi)) and 1.82 MPa (264 psi) on 3 millimeter bars; results are in ° C. Notched Izod was determined according to ASTM D 256 at 23° C. and at −20° C. on 3 millimeter thick bars; results are reported in foot-pounds per inch (ft-lb/in) and Joules per meter (J/m). Tensile modulus and tensile strength were determined according to ASTM D 638 on 3 millimeter thick type I bars and results are reported in Kpsi and MPa. Tensile strength is reported at yield. Flexural modulus and flexural strength were determined according to ASTM method D790 and results are reported in Kpsi and MPa. Compositions and data are shown in Table 2. Amounts are given in weight percent based on the total weight of the composition. The blends were made by melt mixing in a vacuum vented twin screw extruder at 290 to 320° C. at 200 to 300 rotations per minute (rpm). Test parts were injection molded at 290 to 310° C. using a 30 second cycle time from resin dried for at least 4 hours at 100 to 150° C. All molded samples were conditioned for at least 48 hours at 50% relative humidity prior to testing.

TABLE 2

| | Siloxane content | d + 1 | Ex. 1 | Ex. 2 | Ex. 3 | Ex. 4 | Comp. Ex. 1 | Ex. 5 | Ex. 6 | Ex. 7 | Ex. 8 | Ex. 9 | Ex. 10 | Ex. 11 |
|---|---|---|---|---|---|---|---|---|---|---|---|---|---|---|
| PS/PEI BC 3 | 22.9 | 2 | 100 | 75 | 50 | 25 | — | 75 | 50 | 25 | — | — | — | — |
| PS/PEI BC 2 | 21.6 | 4 | — | — | — | — | — | 25 | 50 | 75 | 100 | 25 | 50 | 75 |
| PS/PEI BC 1 | 39.8 | 4 | — | 25 | 50 | 75 | 100 | — | — | — | — | 75 | 50 | 25 |
| Appearance | | | clear | slight haze | slight haze | slight haze | clear | clear | clear | clear | clear | clear | clear | clear |
| Tg (° C.) | | | 172 | 172 | 176 | 174 | 165 | 181 | 190 | 195 | 201 | 182 | 195 | 199 |
| HDT at 0.46 MPa (° C.) | | | 143 | 140 | 133 | 106 | 55 | 147 | 153 | 159 | 159 | 59 | 100 | 130 |
| HDT at 1.82 MPa (° C.) | | | 116 | 122 | 98 | 60 | — | 120 | 125 | 134 | 140 | 43 | 62 | 92 |
| Notched Izod at 25° C. (ft-lbs/in) | | | 1.6 | 8.2 | 9.0 | 7.5 | 5.4 | 3.4 | 6.2 | 7.0 | 18.0 | 5.4 | 9.9 | 15.4 |
| Notched Izod at 25° C. (J/m) | | | 85.4 | 437.9 | 480.6 | 400.5 | 288.4 | 181.6 | 331.1 | 373.8 | 961.2 | 453.9 | 646.1 | 822.4 |
| Notched Izod at −20° C. (ft-lbs/in) | | | 1.2 | 5.4 | 7.0 | 6.3 | 4.2 | 2.2 | 3.5 | 3.8 | 4.6 | 8.5 | 12.1 | 12.1 |
| Notched Izod at −20° C. (J/m) | | | 64.1 | 288.4 | 373.8 | 336.4 | 224.3 | 117.5 | 186.9 | 202.9 | 246.6 | 240.3 | 528.7 | 646.1 |
| Tensile Modulus (Kpsi) | | | 340 | 261 | 187 | 93 | 61 | 321 | 312 | 308 | 264 | — | — | — |
| Tensile Modulus (MPa) | | | 2346 | 1801 | 1290 | 642 | 421 | 2215 | 2153 | 2125 | 1697 | 579 | 876 | 1347 |
| Tensile Strength (Kpsi) | | | 10.3 | 8.3 | 6.2 | 4.1 | 3.0 | 9.9 | 9.7 | 9.6 | 6.8 | — | — | — |
| Tensile Strength (MPa) | | | 71 | 57 | 43 | 28 | 21 | 68 | 67 | 66 | 47 | 25 | 30 | 35 |
| Flexural Modulus (Kpsi) | | | 345 | 269 | 206 | 124 | 52 | 323 | 317 | 305 | 203 | — | — | — |
| Flexural Modulus (MPa) | | | 2381 | 1856 | 1421 | 856 | 359 | 2229 | 2187 | 2105 | 1401 | 438 | 715 | 1027 |
| Flexural Strength (Kpsi) | | | 16.7 | 12.8 | 9.6 | 5.4 | 1.9 | 15.5 | 15.2 | 14.6 | 9.9 | — | — | — |
| Flexural Strength (MPa) | | | 115 | 88 | 66 | 37 | 13 | 107 | 105 | 101 | 68 | 15.9 | 26.9 | 47.6 |

The room temperature notched Izod impact data from Table 2 is presented graphically in FIGS. 4, 5, and 6. FIG. 4 is a graph of the notched Izod impact values of Examples 1 through 4 and Comparative Example 1 (CE 1). As can be seen from the graph, the impact strength of the blends (Examples 2 through 4) exceeds the impact strength of either of individual components (Example 1 and Comparative Example 1). Thus the blend of two polysiloxane/polyimide block copolymers results having differing siloxane contents and degrees of polymerization yields thermoplastic compositions having surprising impact strength.

FIG. 5 is a graph of the room temperature notched Izod values of Examples 8 through 11 and Comparative Example 1. Example 8, a polysiloxane/polyimide block copolymer having a siloxane content of 22.9 wt % and a degree of chain extension of 4 demonstrates remarkably high impact strength. Furthermore, blend of this polysiloxane/polyimide block copolymer with another polysiloxane/polyimide block copolymer having the same degree of chain extension but a different siloxane content yields a thermoplastic composition with remarkably high impact strength, particularly when compared to blends of block copolymers having different degrees of polymerization and the same siloxane content as shown in FIG. 6.

As an additional observation, only the blends of polysiloxane/polyimide block copolymers with each other appear clear and have haze below 25% by visual inspection. When any of the polysiloxane/polyimide block copolymers are blended with a non-siloxane containing polyetherimides the polymer blends are very hazy percent (haze >25% by visual inspection) or are opaque.

While the invention has been described with reference to some embodiments, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiments disclosed as the best mode contemplated for carrying out this invention, but that the invention will include all embodiments falling within the scope of the appended claims.

All cited patents, patent applications, and other references are incorporated herein by reference in their entirety as though set forth in full.

The invention claimed is:

1. A conductive wire comprising:
   a conductor; and
   a covering disposed over the conductor wherein the covering comprises a thermoplastic composition and the thermoplastic composition comprises:
   a first polysiloxane/polyimide block copolymer having a first siloxane content in weight percent, based on the total weight of the first block copolymer, and comprising repeating extended siloxane units of Formula (I)

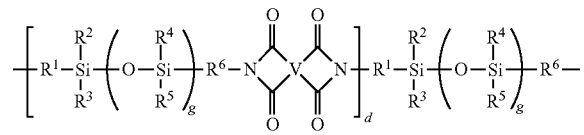

(I)

a second polysiloxane/polyimide block copolymer having a second siloxane content in weight percent, based on the total weight of the second block copolymer, and comprising repeating extended siloxane units of Formula (I)

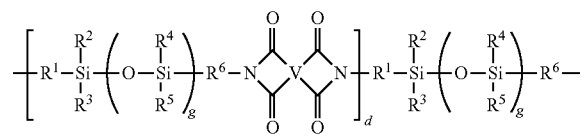

(I)

wherein
$R^{1-6}$ are independently at each occurrence selected from the group consisting of substituted or unsubstituted, saturated, unsaturated or aromatic monocyclic and polycyclic groups having 5 to 30 carbon atoms, substituted or unsubstituted alkyl groups having 1 to 30 carbon atoms and substituted or unsubstituted alkenyl groups having 2 to 30 carbon atoms, V is a tetravalent linker selected from the group consisting of substituted or unsubstituted, saturated, unsaturated or aromatic monocyclic and polycyclic groups having 5 to 50 carbon atoms, substituted or unsubstituted alkyl groups having 1 to 30 carbon atoms, substituted or unsubstituted alkenyl groups having 2 to 30 carbon atoms and combinations comprising at least one of the foregoing linkers, g equals 1 to 30, and d is greater than or equal to 1 and wherein the first siloxane content equals the second siloxane content, the first and second siloxane content is 5 to 30 weight percent based on the total weight of the block copolymer, and the value of d for the first polysiloxane/polyimide block copolymer does not equal the value of d for the second polysiloxane/polyimide block copolymer.

2. The conductive wire of claim 1 wherein $R^{2-5}$ are methyl groups and $R^1$ and $R^6$ are alkylene groups in the first block copolymer and $R^{2-5}$ are methyl groups and $R^1$ and $R^6$ are alkylene groups in the second block copolymer.

3. The conductive wire of claim 1 wherein $R^1$ and $R^6$ are the same or different, and are alkylene groups having 3 to 10 carbon atoms.

4. The conductive wire of claim 3 wherein the siloxane content of the first block copolymer is 10 to 25 weight percent based on the total weight of the first block copolymer and the siloxane content of the second block copolymer is 10 to 25 weight percent based on the total weight of the second block copolymer.

5. The conductive wire of claim 4 wherein the composition has a residual solvent content less than or equal to 500 parts by weight of solvent per million parts by weight of block copolymer, the composition is halogen free, and the amount of alkali and alkaline earth metal ions in the first block copolymer and in the second block copolymer is less than or equal to 1000 parts by weight per million parts by weight of block copolymer.

6. The conductive wire of claim 1 wherein the composition has a residual solvent content less than or equal to 500 parts by weight of solvent per million parts by weight of block copolymer.

7. The conductive wire of claim 1 wherein the siloxane content of the first block copolymer is 10 to 25 weight percent based on the total weight of the first block copolymer and the siloxane content of the second block copolymer is 10 to 25 weight percent based on the total weight of the second block copolymer.

8. The conductive wire of claim 1 wherein the composition is halogen free.

9. The conductive wire of claim 1 wherein for the repeating units of Formula (I) d+1 has a value of 3 to 10 in the first and second block copolymers.

10. The conductive wire of claim 1 wherein the amount of alkali and alkaline earth metal ions in the first block copolymer and in the second block copolymer is less than or equal to 1000 parts by weight per million parts by weight of block copolymer.

* * * * *